(12) United States Patent
Phillips

(10) Patent No.: US 7,963,876 B2
(45) Date of Patent: Jun. 21, 2011

(54) MULTI-SPEED TRANSMISSION

(75) Inventor: Andrew W. Phillips, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 923 days.

(21) Appl. No.: 11/768,590

(22) Filed: Jun. 26, 2007

(65) Prior Publication Data

US 2009/0005209 A1 Jan. 1, 2009

(51) Int. Cl.
*F16H 3/44* (2006.01)
(52) U.S. Cl. ........................................ 475/280
(58) Field of Classification Search .................. None
See application file for complete search history.

(56) References Cited

U.S. PATENT DOCUMENTS

| 5,106,352 | A | | 4/1992 | Lepelletier | |
|---|---|---|---|---|---|
| 5,133,697 | A | * | 7/1992 | Hattori | 475/276 |
| 2004/0266581 | A1 | * | 12/2004 | Stevenson | 475/282 |
| 2005/0037889 | A1 | * | 2/2005 | Hayabuchi et al. | 475/296 |
| 2005/0227806 | A1 | * | 10/2005 | Klemen et al. | 475/275 |

* cited by examiner

*Primary Examiner* — David D Le
*Assistant Examiner* — Erin D Bishop
(74) *Attorney, Agent, or Firm* — Quinn Law Group, PLLC

(57) ABSTRACT

A multi-speed transmission offers seven forward speed ratios with a pleasing ratio step progression, with the seventh forward speed ratio offering a relatively large percentage of the ratio spread, relatively low pinion speeds and only light torque loading on gear members carrying torque in the seventh forward speed ratio due to a brake-type torque transmitting mechanism engaged in the seventh forward speed ratio.

8 Claims, 3 Drawing Sheets

|  | 50 | 52 | 54 | 56 | 57 | 58 |
|---|---|---|---|---|---|---|
| REV |  |  |  | x | x |  |
| 1st | x |  |  |  | x |  |
| 2nd | x |  | x |  |  |  |
| 3rd | x |  |  | x |  |  |
| 4th | x | x |  |  |  |  |
| 5th |  | x |  | x |  |  |
| 6th |  | x | x |  |  |  |
| 7th |  | x |  |  |  | x |

US 7,963,876 B2

MULTI-SPEED TRANSMISSION

TECHNICAL FIELD

The invention relates to a multi-speed transmission having multiple planetary gear sets and at least six torque-transmitting mechanisms engagable in different combinations to provide seven forward speed ratios and a reverse speed ratio.

BACKGROUND OF THE INVENTION

Wide ratio transmissions such as seven or eight speed transmissions offer several advantages including improved vehicle acceleration performance and potentially improved fuel economy over four, five and six speed transmissions. However, increasing the number of speed ratios presents challenges in packaging additional clutches, drive mechanisms for the various gear members, and hydraulic circuit feed paths, and in ensuring an overall axial length that is acceptable.

SUMMARY OF THE INVENTION

A multi-speed transmission offers seven forward speed ratios with a pleasing ratio step progression, with the seventh forward speed ratio offering a relatively large percentage of the ratio spread, relatively low pinion speeds and only light torque loading on gear members carrying torque in the seventh forward speed ratio due to a brake-type torque transmitting mechanism engaged in the seventh forward speed ratio.

More specifically, a multi-speed transmission within the scope of the invention has a first planetary gear set having a first, a second, and a third member. The first planetary gear set is representable as a three-node lever having a first, a second, and a third node corresponding with the first, the second, and the third member, respectively. The transmission also has a second, a third, and a fourth planetary gear set that have a fourth, a fifth, a sixth, a seventh, and an eighth member, with at least two of the second, third and fourth planetary gear sets intermeshing as a compound planetary gear set such that the fourth, fifth, sixth, seventh and eighth members rotate in fixed relation to one another and are representable by a five-node lever having a fourth, a fifth, a sixth, a seventh and an eighth node corresponding with the fourth, fifth, sixth, seventh and eighth members, respectively. As used herein, gear members that "rotate in fixed relation to one another" are interconnected such that their rotational speeds relative to one another are fixed. The first through eighth members are sun gear members, carrier members and ring gear members. The first node is grounded to a stationary member, such as the transmission housing or casing. The third node is continuously connected for common rotation with the input member. The seventh node is continuously connected for common rotation with the output member. Six torque-transmitting mechanisms are selectively engagable in different combinations to establish seven forward speed ratios and a reverse speed ratio between the input member and the output member. Optionally, selective engagement of two of the torque-transmitting mechanisms establishes an additional forward speed ratio between the input member and the output member for a total of eight forward speed ratios.

The seven forward speed ratios include a first, a second, a third, a fourth, a fifth, a sixth and a seventh speed ratio between the input member and the output member. Preferably, the seventh forward speed ratio may be established by a single transition shift from the fourth, the fifth and the sixth speed ratios. Shifts between successive speed ratios also require single transition shifts. Thus, there is a simple, quick and appropriate transmission response to nearly any sudden throttle input. Only two torque-transmitting mechanisms are engaged in each speed ratio, and only one is a rotating-type torque-transmitting mechanism in any given speed ratio. Minimizing the number of rotating-type clutches required enables simpler hydraulic controls.

There are many different transmission embodiments within the scope of the invention in which the planetary gear sets may include simple planetary gear sets, dual-pinion planetary gear sets, and a compound planetary gear set made up of two or three of the four planetary gear sets included in the transmission. In some embodiments, a first and a second interconnecting member connect different members of the planetary gear sets for common rotation. In some embodiments, the third brake-type torque-transmitting mechanism is positioned closer to the output member than any of the other torque-transmitting mechanisms.

Preferably, the six torque-transmitting mechanisms include a first rotating-type torque-transmitting mechanism that is selectively engagable to connect the second node for common rotation with the eighth node. A second rotating-type torque-transmitting mechanism is selectively engagable to connect the third node for common rotation with the sixth node. A third rotating-type torque-transmitting mechanism is selectively engagable to connect the second node for common rotation with the fourth node. A first brake-type torque-transmitting mechanism is selectively engagable to ground the fourth node to the stationary member. A second brake-type torque-transmitting mechanism is selectively engagable to ground the sixth node to the stationary member. A third brake-type torque-transmitting mechanism selectively engagable to ground the fifth node to the stationary member.

The seventh speed ratio is significantly higher than the sixth speed ratio, (with the exact percentage increase in speed ratio depending on the specific ring gear member to sun gear member speed ratios selected), and thus increases the overall speed ratio of the transmission by the same amount. The seventh speed ratio can thus be used to provide lower highway engine speeds and/or better performance at low speeds. The torque-transmitting mechanisms engaged in the seventh (top) speed ratio handle relatively low amounts of torque and can thus be sized very compactly. The specific ring gear member to sun gear member tooth ratios may be selected to ensure a good ratio progression, low sun gear torques and low pinion speeds.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
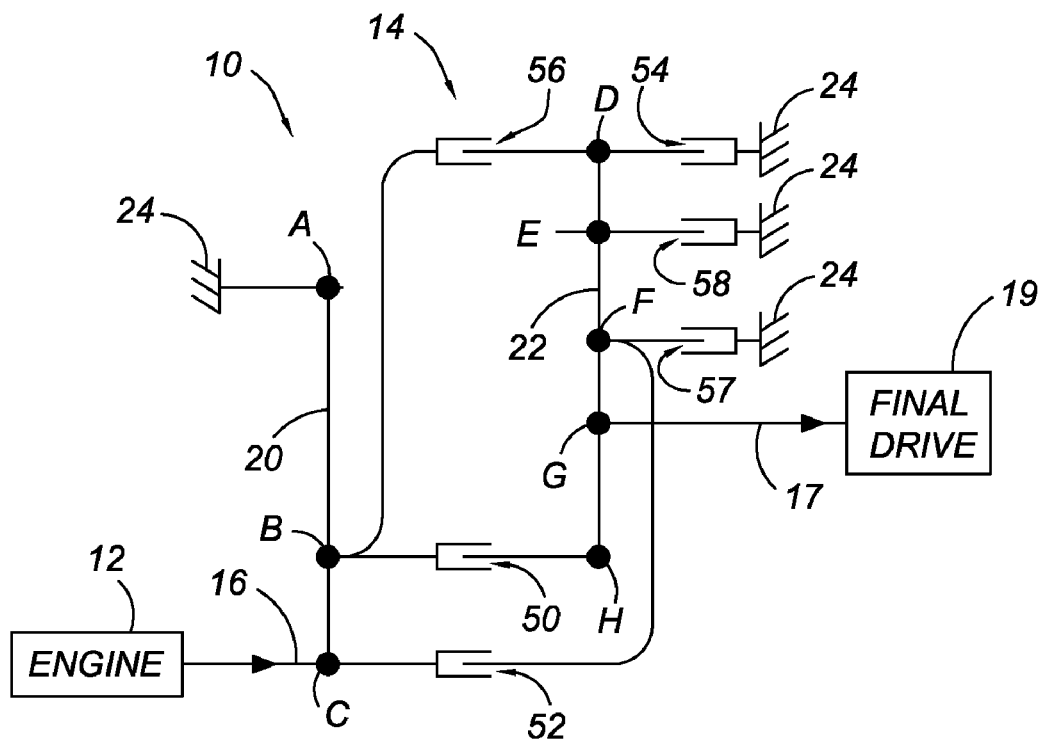
FIG. 1 is an embodiment of a transmission in accordance with the invention shown in lever diagram form.
FIG. 2 is a truth table showing an engagement schedule for the torque-transmitting mechanisms of the transmission of FIG. 1 to establish seven forward speed ratios and a reverse speed ratio.

Referring to the drawings, wherein like reference numbers refer to like components, FIG. 1 illustrates a powertrain 10, schematically in lever diagram form, mounted on and partially forming a vehicle (not shown). The powertrain 10 includes an engine 12 connected to a transmission 14. The transmission 14 is designed to receive driving power from the engine 12, as discussed below. The engine 12 powers an input member 16 of the transmission 14. A final drive unit 19 is operatively connected to an output member 17 of the transmission 14.

The transmission 14 includes a three-node lever 20 representing a first planetary gear set having a first, a second and a third member, represented by nodes A, B and C, respectively. The members may be a ring gear member, a sun gear member and a carrier member, although not necessarily in that order. Nodes, A, B and C are referred to in the claims as the first, second and third nodes, respectively. As used herein, a "node" is a component of a transmission, such as a ring gear member, a carrier member, or a sun gear member, which is characterized by a rotational speed and which can act as a junction of torques applied to that component from other components and by that component to other components. The other components which may interact with a given node include other coaxial members of the same set of planetary gears which appear as other nodes on the same lever. The other components which may interact with a given node also include interconnections to members of other planetary gear sets which appear as nodes on another lever, a stationary member such as the transmission case, and other transmission members.

The transmission 14 further includes a five-node lever 22 representing second, third and fourth planetary gear sets interconnected so as to be representable by nodes D, E, F, G and H, respectively. As those skilled in the art will readily understand, two or more planetary gear sets may be represented as a single lever in a lever diagram when two different members of one of the planetary gear sets are connected for common rotation with two different members of the other planetary gear set and/or when planetary gear sets intermesh as a compound planetary gear set. Each of the nodes D, E, F, G and H represent a ring gear member, a sun gear member, or a carrier member, although not necessarily in that order. Nodes D, E, F, G and H are referred to in the claims as the fourth, fifth, sixth, seventh, and eighth node, respectively.

The input member 16 is connected for common rotation with node C. The output member 17 is connected for common rotation with node G. Node A is continuously grounded to a stationary member 24.

The transmission 14 also has selectively engagable torque-transmitting mechanisms that provide various speed ratios, as described below. Torque-transmitting mechanism 50, a rotating-type clutch, is selectively engagable to connect node B for common rotation with node H. Torque-transmitting mechanism 52, also a rotating-type clutch, is selectively engagable to connect node C for common rotation with node F. Another torque-transmitting mechanism 54, a stationary clutch, also referred to as a brake-type toque-transmitting mechanism, is selectively engagable to ground node D to the stationary member 24. Torque-transmitting mechanism 56, a rotating-type clutch, is selectively engagable to connect node B for common rotation with node D. Torque-transmitting mechanism 57, a stationary-type clutch, also referred to as a brake-type torque-transmitting mechanism, is selectively engagable to ground node F to the stationary member 24. Torque-transmitting mechanism 58, a stationary-type clutch, also referred to as a brake-type torque-transmitting mechanism, is selectively engagable to ground node E to the stationary member 24.

The torque-transmitting mechanisms 50, 52, 54, 56, 57 and 58 are selectively engagable in the different combinations of pairs, as illustrated in FIG. 2, to provide a reverse speed ratio (REV), and seven forward speed ratios (1st, 2nd, 3rd, 4th, 5th, 6th, and 7th). Each speed ratio established in FIG. 2 may also be referred to as a "gear". Those skilled in the art will readily recognize that the engagement of these different combinations of torque-transmitting mechanisms shown in FIG. 2 will result in seven forward speed ratios having different numerical values, as well as a reverse speed ratio.

Optionally, the transmission 14 may be operated as an eight-speed transmission if the torque-transmitting mechanisms 50 and 58 are engaged following the second speed ratio (2nd) to establish an additional forward speed ratio, not listed in the table of FIG. 2, for a total of eight forward speed ratios.

A controller (not shown) is operatively connected with the torque-transmitting mechanisms and is programmed with an algorithm to select different ones of the speed ratios set forth in FIG. 2 to provide seven forward speed ratios (1st, 2nd, 3rd, 4th, 5th, 6th, and 7th) and the reverse speed ratio. Alternatively, less than seven of the forward speed ratios may also be selected, such as to enable a five-speed or six-speed transmission with single-transition shifts. The speed ratios chosen or permitted by the controller may depend upon whether single-transition shifts are desired. As used herein, a "single-transition shift" in the context of speed ratios established with pairs of engaged torque-transmitting mechanisms means that one torque-transmitting mechanism remains engaged and another torque-transmitting mechanism is disengaged while a different torque-transmitting mechanism is engaged in shifting from one speed ratio to a subsequent speed ratio (whether in an upshift or a downshift). As is apparent from FIG. 2, the seven forward speed ratios 1st, 2nd, 3rd, 4th, 5th, 6th, and 7th, are operable in progression with single-transition shifts. Additionally, there are multiple single-transition upshifts (shifts from a lower numbered speed ratio to a higher numbered speed ratio (i.e., 1 st to 2nd), which are shifts from a higher numerical speed ratio to a lower numerical speed ratio. For example, a shift from the fourth (4th), fifth (5th) or sixth (6th) forward speed ratio to the seventh (7th) forward speed ratio is a single transition shift.

The topology and ring gear member to sun gear member tooth ratios of a specific transmission embodiment implementing the lever diagram embodiment of FIG. 1 will determine the most pleasing progression of the forward speed ratios for a given application and/or driving situation. Because each of the speed ratios established as set forth in FIG. 2 require only two torque-transmitting mechanisms to be applied, and because most utilize only one rotating clutch (i.e., only one of torque-transmitting mechanisms 50, 52, and 56), hydraulic leakage losses are minimized, as these are more commonly encountered with rotating-type than with stationary-type torque-transmitting mechanisms.

Figure 3:
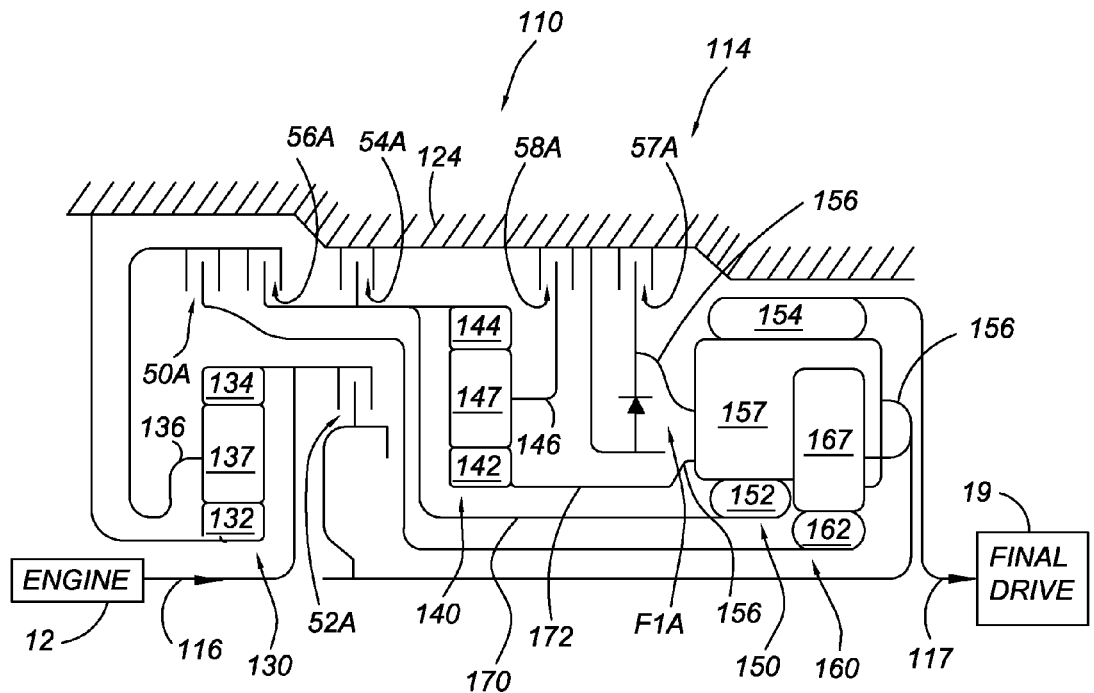
FIG. 3 is a first embodiment in stick diagram form of the transmission of FIG. 1.

Referring to FIG. 3, a powertrain 110 has a transmission 114 configured in accordance with and operable in like manner as the transmission 14 shown in lever diagram form in FIG. 1. The powertrain 110 includes engine 12 powering an input member 116 of the transmission 114. Final drive unit 19 is operatively connected to an output member 117 of the transmission 114.

The transmission 114 includes simple planetary gear sets 130 and 140, as well as planetary gear sets 150 and 160 interconnected to form a compound planetary gear set 150, 160. Planetary gear set 130 includes a sun gear member 132, a ring gear member 134, and a carrier member 136 that rotatably supports a plurality of pinion gears 137 that mesh with both the ring gear member 134 and the sun gear member 132.

Planetary gear set 140 includes a sun gear member 142, a ring gear member 144, and a carrier member 146 that rotatably supports a plurality of pinion gears 147 that mesh with both the ring gear member 144 and the sun gear member 142.

Compound planetary gear set 150, 160 includes planetary gear set 150 having a sun gear member 152, a ring gear member 154 and a carrier member 156 that rotatably supports a plurality of pinion gears 157 that mesh with both the sun gear member 152 and the ring gear member 154. The pinion gears 157 are long pinion gears. The carrier member 156 also rotatably supports a second set of pinion gears 167 that are included in planetary gear set 160. Gear set 160 also includes sun gear member 162. Pinion gears 167 mesh with the pinion gears 157 and with the sun gear member 162.

The input member 116 is continuously connected for common rotation with the ring gear member 134. Sun gear member 132 is continuously grounded to a stationary member 124, such as a casing of the transmission 114. Ring gear member 154 is continuously connected for common rotation with output member 117. An interconnecting member 170 continuously connects ring gear member 144 for common rotation with sun gear member 152. Interconnecting member 172 continuously connects sun gear member 142 for common rotation with carrier member 156.

The transmission 114 has six selectively engagable torque-transmitting mechanisms 50A, 52A, 54A, 56A, 57A, and 58A, as well as a free-wheeling one-way clutch F1A that is that is connected in parallel with torque-transmitting mechanism 57A and permits rotation in only one direction. Torque-transmitting mechanism 50A is a rotating-type clutch that is selectively engagable to connect carrier member 136 for common rotation with sun gear member 162. Torque-transmitting mechanism 52A is a rotating-type clutch that is selectively engagable to connect input member 116 and ring gear member 134 for common rotation with carrier member 156. Torque-transmitting mechanism 54A is a brake-type torque-transmitting mechanism that is selectively engagable to ground ring gear member 144 with stationary member 124. Free-wheeling one-way clutch F1A prevents rotation of carrier member 156 in a direction opposite the input member 116. Torque-transmitting mechanism 56A a rotating-type clutch that is selectively engagable to connect carrier member 136 for common rotation with ring gear member 144 and sun gear member 152. Torque-transmitting mechanism 57A is a brake-type torque-transmitting mechanism that is selectively engagable to ground carrier member 156 to the stationary member 124. Torque-transmitting mechanism 58A is a brake-type torque-transmitting mechanism that is selectively engagable to ground carrier member 146 to the stationary member 124.

The members of transmission 114 correspond with the lever diagram transmission 14 of FIG. 1 as follows: sun gear member 132 corresponds with node A; carrier member 136 corresponds with node B; ring gear member 134 corresponds with node C; interconnected ring gear member 144 and sun gear member 152 correspond with node D; carrier member 146 corresponds with node E; interconnected sun gear member 142 and carrier member 156 correspond with node F; ring gear member 154 corresponds with node G; and sun gear member 162 corresponds with node H. The torque-transmitting mechanisms 50A, 52A, 54A, 56A, 57A, and 58A correspond with torque-transmitting mechanisms 50, 52, 54, 56, 57, and 58, respectively, and are engagable according to the same schedule of FIG. 2 to achieve seven forward speed ratios and a reverse speed ratio (and, optionally, an eighth forward speed ratio by engaging torque-transmitting mechanisms 50A and 58A).

One exemplary set of gear tooth counts for the transmission 114 is as follows: ring gear member 134: 89 teeth; sun gear member 132: 49 teeth; ring gear member 144: 97 teeth; sun gear member 142: 57 teeth; ring gear member 154: 87 teeth; sun gear member 152: 43 teeth; and sun gear member 162: 35 teeth. With the engagement schedule as set forth in FIG. 2 for corresponding torque-transmitting mechanisms, the following speed ratios are attained: reverse speed ratio (REV): −3.137; first forward speed ratio (1st): 3.854; second forward speed ratio (2nd): 2.313; third forward speed ratio (3rd): 1.551; fourth forward speed ratio (4th): 1.167; fifth forward speed ratio (5th): 0.851; sixth forward speed ratio (6th): 0.669; and seventh forward speed ratio (7th): 0.560. The following corresponding ratio steps are achieved: REV/1st: −0.81; 1st/2nd: 1.67; 2nd/3rd: 1.49; 3rd/4th: 1.33; 4th/5th: 1.37; 5th/6th: 1.27; and 6th/7th: 1.19. This corresponds with an overall ratio spread (1st/7th) of 6.88. Depending on the tooth ratios utilized, the seventh speed ratio (7th) may be approximately 16 to 18 percent higher than the sixth speed ratio (6th), with the sun gear member 142 handling about 15 percent of the torque on the input member 116 and the torque-transmitting mechanism 58A only about 43 percent of the torque on the input member 116.

The highest speed for each set of pinions in any of the speed ratios with respect to the speed of the input member is as follows: pinion gears 137: 1.58; pinion gears 147: 1.158; pinion gears 157: 3.103; and pinion gears 167: 2.968. Planetary gear set 140 is lightly loaded, with its members carrying torque only during the seventh forward speed ratio due to engagement of brake-type torque-transmitting mechanism 58A. In the seventh forward speed ratio, the members of planetary gear set carry the following torque ratios with respect to the torque at the input member 116: sun gear member 142: 0.163; ring gear member 144: 0.277; and carrier member 146: −0.440.

Figure 4:
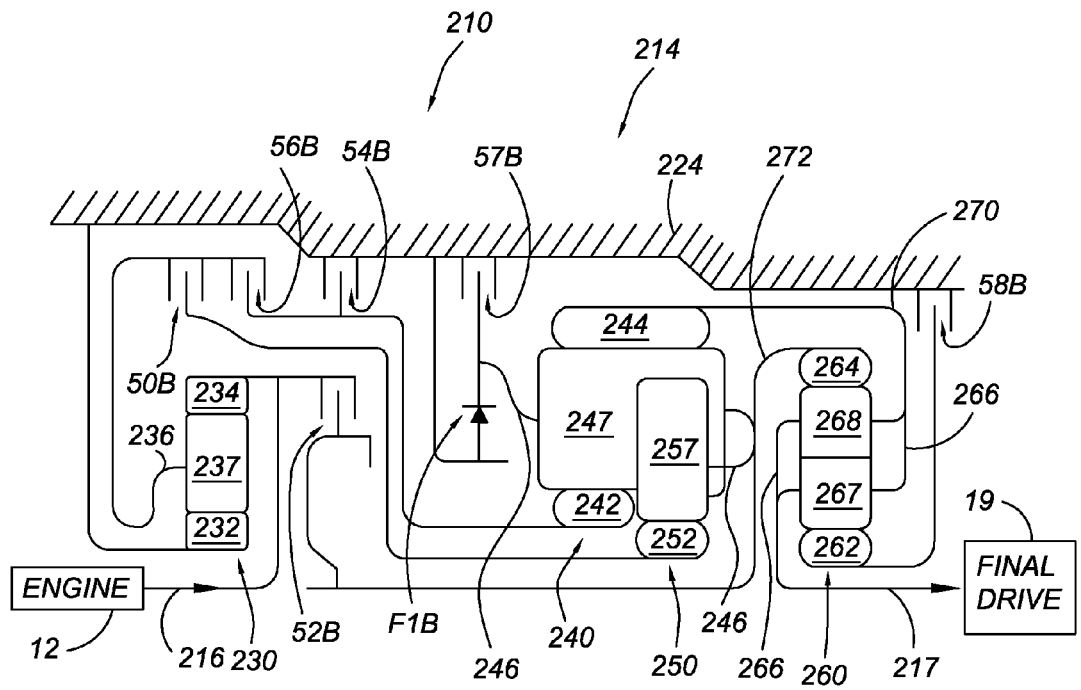
FIG. 4 is a second embodiment in stick diagram form of the transmission of FIG. 1.

Referring to FIG. 4, a powertrain 210 has a transmission 214 configured in accordance with and operable in like manner as the transmission 14 shown in lever diagram form in FIG. 1. The powertrain 210 includes engine 12 powering an input member 216 of the transmission 214. Final drive unit 19 is operatively connected to an output member 217 of the transmission 214.

The transmission 214 includes simple planetary gear set 230, as well as planetary gear sets 240 and 250 interconnected to form a compound planetary gear set 240, 250, and dual-pinion planetary gear set 260. Planetary gear set 230 includes a sun gear member 232, a ring gear member 234, and a carrier member 236 that rotatably supports a plurality of pinion gears 237 that mesh with both the ring gear member 234 and the sun gear member 232.

Compound planetary gear set 240, 250 includes planetary gear set 240 having a sun gear member 242, a ring gear member 244 and a carrier member 246 that rotatably supports a plurality of pinion gears 247 that mesh with both the sun gear member 242 and the ring gear member 244. The pinion gears 247 are long pinion gears. The carrier member 246 also rotatably supports a second set of pinion gears 257 that are included in planetary gear set 250. Gear set 250 also includes sun gear member 252. Pinion gears 257 mesh with the pinion gears 247 and with the sun gear member 252.

Planetary gear set 260 is a dual-pinion planetary gear set that includes a sun gear member 262, a ring gear member 264, and a carrier member 266. The carrier member 266 rotatably supports a first set of pinion gears 267 and a second set of pinion gears 268. Pinion gears 267 mesh with both the sun gear member 262 and the second set of pinion gears 268. Pinion gears 268 mesh with pinion gears 267 and ring gear member 264.

The input member 216 is continuously connected for common rotation with the ring gear member 234. Sun gear member 232 is continuously grounded to a stationary member 224, such as a casing of the transmission 214. Carrier member 266 is continuously connected for common rotation with output member 217. An interconnecting member 270 continuously connects ring gear member 244 for common rotation with carrier member 266. Interconnecting member 272 continuously connects carrier member 246 for common rotation with ring gear member 264.

The transmission 214 has six selectively engagable torque-transmitting mechanisms 50B, 52B, 54B, 56B, 57B, and 58B, as well as a free-wheeling one-way clutch F1B that is that is connected in parallel with torque-transmitting mechanism 57B and permits rotation in only one direction. Torque-transmitting mechanism 50B is a rotating-type clutch that is selectively engagable to connect carrier member 236 for common rotation with sun gear member 252. Torque-transmitting mechanism 52B is a rotating-type clutch that is selectively engagable to connect input member 216 and ring gear member 234 for common rotation with carrier member 246. Torque-transmitting mechanism 54B is a brake-type torque-transmitting mechanism that is selectively engagable to ground sun gear member 242 with stationary member 224. Free-wheeling one-way clutch F1B prevents rotation of carrier member 246 in a direction opposite the input member 216. Torque-transmitting mechanism 56B is a rotating-type clutch that is selectively engagable to connect carrier member 236 for common rotation with sun gear member 242. Torque-transmitting mechanism 57B is a brake-type torque-transmitting mechanism that is selectively engagable to ground carrier member 246 to the stationary member 224. Torque-transmitting mechanism 58B is a brake-type torque-transmitting mechanism that is selectively engagable to ground sun gear member 262 to the stationary member 224.

The members of transmission 214 correspond with the lever diagram transmission 14 of FIG. 1 as follows: sun gear member 232 corresponds with node A; carrier member 236 corresponds with node B; ring gear member 234 corresponds with node C; sun gear member 242 corresponds with node D; sun gear member 262 corresponds with node E; interconnected carrier member 246 and sun gear member 264 correspond with node F; interconnected carrier member 266 and ring gear member 244 correspond with node G; and sun gear member 252 corresponds with node H. The torque-transmitting mechanisms 50B, 52B, 54B, 56B, 57B, and 58B correspond with torque-transmitting mechanisms 50, 52, 54, 56, 57, and 58, respectively, and are engagable according to the same schedule of FIG. 2 to achieve seven forward speed ratios and a reverse speed ratio (and, optionally, an eighth forward speed ratio by engaging torque-transmitting mechanisms 50B and 58B).

One exemplary set of gear tooth counts for the transmission 214 is as follows: ring gear member 234: 89 teeth; sun gear member 232: 49 teeth; ring gear member 244: 87 teeth; sun gear member 242: 43 teeth; sun gear member 252: 35 teeth; ring gear member 264: 79 teeth and sun gear member 262: 35 teeth. With the engagement schedule as set forth in FIG. 2 for corresponding torque-transmitting mechanisms, the following speed ratios are attained: reverse speed ratio (REV): −3.138; first forward speed ratio (1st): 3.868; second forward speed ratio (2nd): 2.317; third forward speed ratio (3rd): 1.551; fourth forward speed ratio (4th): 1.166; fifth forward speed ratio (5th): 0.851; sixth forward speed ratio (6th): 0.669; and seventh forward speed ratio (7th): 0.557. The following corresponding ratio steps are achieved: REV/1st: −0.81; 1st/2nd: 1.67; 2nd/3rd: 1.49; 3rd/4th: 1.33; 4th/5th: 1.37; 5th/6th: 1.27; and 6th/7th: 1.20. This corresponds with an overall ratio spread (1st/7th) of 6.94.

The highest speed for each set of pinions in any of the speed ratios with respect to the speed of the input member is as follows: pinion gears 237: 1.58; pinion gears 247: 3.145; pinion gears 257: 2.950; pinion gears 267: −3.142; and pinion gears 268: −3.142. Planetary gear set 260 is lightly loaded, with its members carrying torque only during the seventh forward speed ratio due to engagement of brake-type torque-transmitting mechanism 58B. In the seventh forward speed ratio, the members of planetary gear set 260 carry the following torque ratios with respect to the torque at the input member 216: sun gear member 262: −0.443; ring gear member 264: 1.000; and carrier member 266: −0.557. Depending on the tooth ratios utilized, the seventh speed ratio (7th) may be approximately 18 to 23 percent higher than the sixth speed ratio (6th), with the sun gear member 262 and the torque-transmitting mechanism 58B handling only about 44 percent of the torque on the input member 116.

Figure 5:
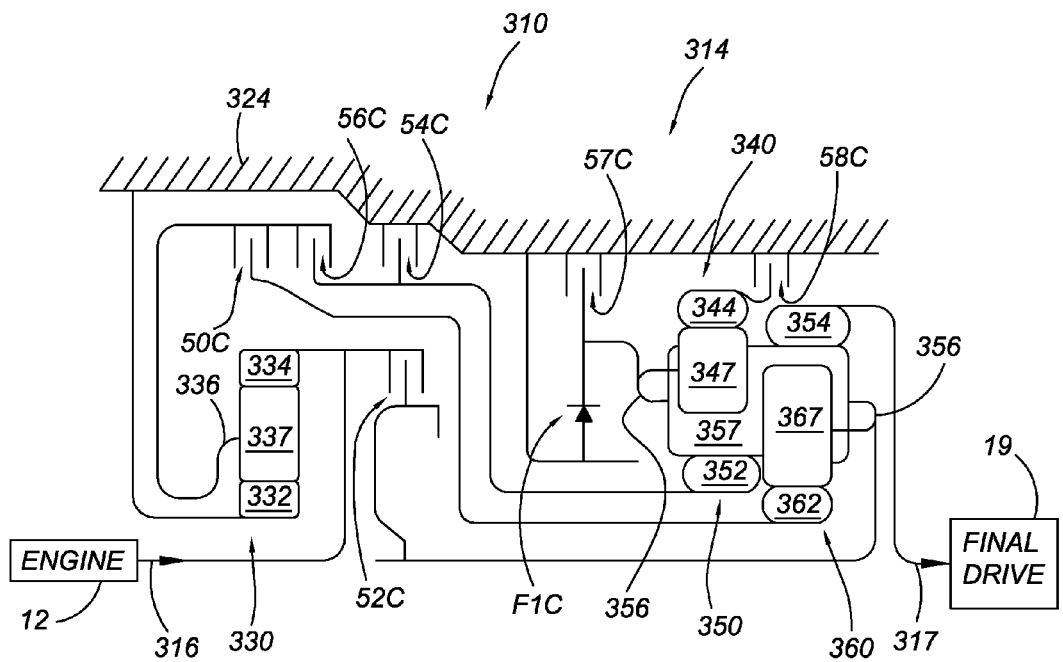
FIG. 5 is a third embodiment in stick diagram form of the transmission of FIG. 1.

Referring to FIG. 5, a powertrain 310 has a transmission 314 configured in accordance with and operable in like manner as the transmission 14 shown in lever diagram form in FIG. 1. The powertrain 310 includes engine 12 powering an input member 316 of the transmission 314. Final drive unit 19 is operatively connected to an output member 317 of the transmission 314.

The transmission 314 includes simple planetary gear set 330, as well as planetary gear sets 340, 350 and 360 interconnected to form a compound planetary gear set 340, 350, 360. Planetary gear set 330 includes a sun gear member 332, a ring gear member 334, and a carrier member 336 that rotatably supports a plurality of pinion gears 337 that mesh with both the ring gear member 334 and the sun gear member 332.

Compound planetary gear set 340, 350, 360 includes planetary gear set 340 having a ring gear member 344 intermeshing with a first set of pinion gears 347. Planetary gear set 350 has a sun gear member 352, a ring gear member 354 and a carrier member 356 that rotatably supports a second set of pinion gears 357 that mesh with both the sun gear member 352, the ring gear member 354 and the pinion gears 347. Carrier member 356 also rotatably supports the pinion gears 347. The pinion gears 357 are long pinion gears. The carrier member 356 also rotatably supports a third set of pinion gears 367 that are included in planetary gear set 360. Gear set 360 also includes sun gear member 362. Pinion gears 367 mesh with the pinion gears 357 and with the sun gear member 362.

The input member 316 is continuously connected for common rotation with the ring gear member 334. Sun gear member 332 is continuously grounded to a stationary member 324, such as a casing of the transmission 314. Ring gear member 354 is continuously connected for common rotation with output member 317.

The transmission 314 has six selectively engagable torque-transmitting mechanisms 50C, 52C, 54C, 56C, 57C, and 58C, as well as a free-wheeling one-way clutch F1C that is that is connected in parallel with torque-transmitting mechanism 57C and permits rotation in only one direction. Torque-transmitting mechanism 50C is a rotating-type clutch that is selectively engagable to connect carrier member 336 for common rotation with sun gear member 362. Torque-transmitting mechanism 52C is a rotating-type clutch that is selectively engagable to connect input member 316 and ring gear member 334 for common rotation with carrier member 356. Torque-transmitting mechanism 54C is a brake-type torque-transmitting mechanism that is selectively engagable to ground sun gear member 354 with stationary member 324. Free-wheeling one-way clutch F1C prevents rotation of carrier member 356 in a direction opposite the input member 316. Torque-transmitting mechanism 56C a rotating-type clutch that is selectively engagable to connect carrier member 336 for common rotation with sun gear member 352. Torque-transmitting mechanism 57C is a brake-type torque-transmitting mechanism that is selectively engagable to ground carrier member 356 to the stationary member 324. Torque-transmitting mechanism 58C is a brake-type torque-transmitting mechanism that is selectively engagable to ground ring gear member 344 to the stationary member 324.

The members of transmission 314 correspond with the lever diagram transmission 14 of FIG. 1 as follows: sun gear member 332 corresponds with node A; carrier member 336 corresponds with node B; ring gear member 334 corresponds with node C; sun gear member 352 corresponds with node D; ring gear member 344 corresponds with node E; carrier member 356 corresponds with node F; ring gear member 354 corresponds with node G; and sun gear member 362 corresponds with node H. The torque-transmitting mechanisms 50C, 52C, 54C, 56C, 57C, and 58C correspond with torque-transmitting mechanisms 50, 52, 54, 56, 57, and 58, respectively, and are engagable according to the same schedule of FIG. 2 to achieve seven forward speed ratios and a reverse speed ratio (and, optionally, an eighth forward speed ratio by engaging torque-transmitting mechanisms 50C and 58C).

One exemplary set of gear tooth counts for the transmission 314 is as follows: ring gear member 334: 89 teeth; sun gear member 332: 49 teeth; ring gear member 344: 79 teeth; sun gear member 352: 39 teeth; ring gear member 354: 79 teeth; sun gear member 352: 39 teeth; and sun gear member 362: 33 teeth. With the engagement schedule as set forth in FIG. 2 for corresponding torque-transmitting mechanisms, the following speed ratios are attained: reverse speed ratio (REV): −3.141; first forward speed ratio (1st): 3.712; second forward speed ratio (2nd): 2.265; third forward speed ratio (3rd): 1.551; fourth forward speed ratio (4th): 1.174; fifth forward speed ratio (5th): 0.851; sixth forward speed ratio (6th): 0.669; and seventh forward speed ratio (7th): 0.500. The following corresponding ratio steps are achieved: REV/1st: −0.85; 1st/2nd: 1.64; 2nd/3rd: 1.46; 3rd/4th: 1.32; 4th/5th: 1.38; 5th/6th: 1.27; and 6th/7th: 1.34. This corresponds with an overall ratio spread (1st/7th) of 7.42. Depending on the tooth ratios utilized, the seventh speed ratio (7th) may be approximately 29 to 38 percent higher than the sixth speed ratio (6th), with the ring gear member 344 and the torque-transmitting mechanism 58C handling only about 50 percent of the torque on the input member 316.

The highest speed for each set of pinions in any of the speed ratios with respect to the speed of the input member are as follows: pinion gears 337: 1.58; pinion gears 347: −3.950; pinion gears 357: 3.950; and pinion gears 367: 3.958. Planetary gear set 340 is lightly loaded, with its members carrying torque only during the seventh forward speed ratio due to engagement of brake-type torque-transmitting mechanism 58C. In the seventh forward speed ratio, the members of planetary gear set 340 carry the following torque ratios with respect to the torque at the input member 316: ring gear member 344: −0.500. The sun gear member 352 of planetary gear set 350: 0.247; and carrier member 356 of planetary gear set 350 is 0.253.

Figure 6:
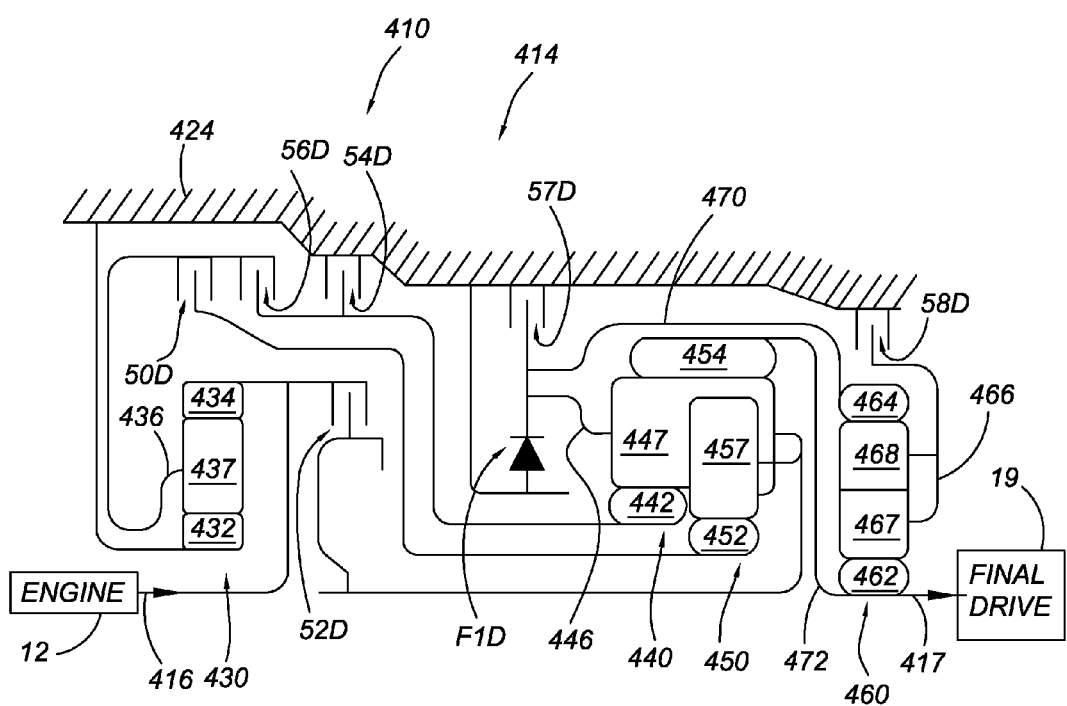
FIG. 6 is a fourth embodiment in stick diagram form of the transmission of FIG. 1.

Referring to FIG. 6, a powertrain 410 has a transmission 414 configured in accordance with and operable in like manner as the transmission 14 shown in lever diagram form in FIG. 1. The powertrain 410 includes engine 12 powering an input member 416 of the transmission 414. Final drive unit 19 is operatively connected to an output member 417 of the transmission 414.

The transmission 414 includes simple planetary gear set 430, as well as planetary gear sets 440 and 450 interconnected to form a compound planetary gear set 440, 450, and dual-pinion planetary gear set 460. Planetary gear set 430 includes a sun gear member 432, a ring gear member 434, and a carrier member 436 that rotatably supports a plurality of pinion gears 437 that mesh with both the ring gear member 434 and the sun gear member 432.

Compound planetary gear set 440, 450 includes planetary gear set 440 having a sun gear member 442, a carrier member 446 that rotatably supports a plurality of pinion gears 447 that mesh with the sun gear member 442. The pinion gears 447 are long pinion gears. The carrier member 446 also rotatably supports a second set of pinion gears 457 that are included in planetary gear set 450. Gear set 450 also includes a sun gear member 452 and a ring gear member 454. Pinion gears 457 mesh with the pinion gears 447 and with the sun gear member 452.

Planetary gear set 460 is a dual-pinion planetary gear set that includes a sun gear member 462, a ring gear member 464, and a carrier member 466. The carrier member 466 rotatably supports a first set of pinion gears 467 and a second set of pinion gears 468. Pinion gears 467 mesh with both the sun gear member 462 and the second set of pinion gears 468. Pinion gears 468 mesh with pinion gears 467 and ring gear member 464. The transmission 414 is very compact radially because sun gear member 462 can be incorporated directly into output member 417, rather than spinning around it.

The input member 416 is continuously connected for common rotation with the ring gear member 434. Sun gear member 432 is continuously grounded to a stationary member 424, such as a casing of the transmission 414. Ring gear member 454 and sun gear member 462 are continuously connected for common rotation with output member 417. An interconnecting member 470 continuously connects ring gear member 464 for common rotation with carrier member 446. Interconnecting member 472 continuously connects ring gear member 454 for common rotation with sun gear member 462.

The transmission 414 has six selectively engagable torque-transmitting mechanisms 50D, 52D, 54D, 56D, 57D, and 58D, as well as a free-wheeling one-way clutch F1D that is that is connected in parallel with torque-transmitting mechanism 57D and permits rotation in only one direction. Torque-transmitting mechanism 50D is a rotating-type clutch that is selectively engagable to connect carrier member 436 for common rotation with sun gear member 452. Torque-transmitting mechanism 52D is a rotating-type clutch that is selectively engagable to connect input member 416 and ring gear member 434 for common rotation with carrier member 446. Torque-transmitting mechanism 54D is a brake-type torque-transmitting mechanism that is selectively engagable to ground sun gear member 442 with stationary member 424. Free-wheeling one-way clutch F1D prevents rotation of carrier member 446 in a direction opposite the input member 416. Torque-transmitting mechanism 56D is a rotating-type clutch that is selectively engagable to connect carrier member 436 for common rotation with sun gear member 442. Torque-transmitting mechanism 57D is a brake-type torque-transmitting mechanism that is selectively engagable to ground carrier member 446 to the stationary member 424. Torque-transmitting mechanism 58D is a brake-type torque-transmitting mechanism that is selectively engagable to ground carrier member 466 to the stationary member 424.

The members of transmission 414 correspond with the lever diagram transmission 14 of FIG. 1 as follows: sun gear member 432 corresponds with node A; carrier member 436 corresponds with node B; ring gear member 434 corresponds with node C; sun gear member 442 corresponds with node D; carrier member 466 corresponds with node E; interconnected carrier member 446 and ring gear member 464 correspond with node F; interconnected sun gear member 462 and ring gear member 454 correspond with node G; and sun gear member 452 corresponds with node H. The torque-transmitting mechanisms 50D, 52D, 54D, 56D, 57D, and 58D correspond with torque-transmitting mechanisms 50, 52, 54, 56, 57, and 58, respectively, and are engagable according to the same schedule of FIG. 2 to achieve seven forward speed ratios and a reverse speed ratio (and, optionally, an eighth forward speed ratio by engaging torque-transmitting mechanisms 50D and 58D).

One exemplary set of tooth ratios for the transmission 414 is as follows: ring gear member 434 to sun gear member 432: 1.82; ring gear member 454 to sun gear member 442: 2.06; ring gear member 454 to sun gear member 452: 2.62; and ring gear member 464 to sun gear member 462: 1.80. With the engagement schedule as set forth in FIG. 2 for corresponding torque-transmitting mechanisms, the following speed ratios are attained: reverse speed ratio (REV): −3.192; first forward speed ratio (1st): 4.060; second forward speed ratio (2nd): 2.370; third forward speed ratio (3rd): 1.549; fourth forward speed ratio (4th): 1.157; fifth forward speed ratio (5th): 0.853; sixth forward speed ratio (6th): 0.673; and seventh forward speed ratio (7th): 0.556. The following corresponding ratio steps are achieved: REV/1st: −0.79; 1st/2nd: 1.71; 2nd/3rd: 1.53; 3rd/4th: 1.34; 4th/5th: 1.36; 5th/6th: 1.27; and 6th/7th: 1.21. This corresponds with an overall ratio spread (1st/7th) of 7.31.

The highest speed for each set of pinions in any of the speed ratios with respect to the speed of the input member 416 are as follows: pinion gears 437: 1.574; pinion gears 447: 3.109; pinion gears 457: 3.044; pinion gears 467: 5.294; and pinion gears 468: 5.294. Planetary gear set 460 is lightly loaded, with its members carrying torque only during the seventh forward speed ratio due to engagement of brake-type torque-transmitting mechanism 58B. In the seventh forward speed ratio, the members of planetary gear set 460 carry the following torque ratios with respect to the torque at the input member 416: sun gear member 462: −0.556; ring gear member 464: 1.000; and carrier member 466: −0.444. Depending on the tooth ratios utilized, the seventh speed ratio (7th) may be approximately 20 to 100 percent higher than the sixth speed ratio (6th), with the sun gear member 462 and the torque-transmitting mechanism 58D handling only about 56 and 44 percent of the torque on the input member 116, respectively.

Thus, there are several exemplary stick-diagram embodiments of transmissions 114, 214, 314 and 414 corresponding with the embodiment of transmission 14 in lever diagram form in FIG. 1. Each embodiment offers seven forward speed ratios with an evenly-spaced ratio progression, a good overall ratio spread, relatively low pinion speeds, and relatively low torque on the brake-type-torque transmitting mechanism loaded in the seventh forward speed ratio and the planetary gear set with a member grounded thereby.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input member and an output member;
a first planetary gear set having a first, a second, and a third member;
a second, a third, and a fourth planetary gear set having a fourth, a fifth, a sixth, a seventh, and an eighth member which rotate in fixed relation to one another; wherein at least two of the second, third and fourth planetary gear sets intermesh as a compound planetary gear set; wherein the first member is continuously grounded to a stationary member; wherein the third member is continuously connected for common rotation with the input member; wherein the seventh member is continuously connected for common rotation with the output member; and
six torque-transmitting mechanisms selectively engagable in different combinations to establish at least seven forward speed ratios and a reverse speed ratio between the input member and the output member; wherein said at least seven forward speed ratios include a first, a second, a third, a fourth, a fifth, a sixth, and a seventh forward speed ratio from highest to lowest numerical speed ratio; and wherein one of said six torque-transmitting mechanisms is selectively engagable to ground the fifth member to the stationary member and is engaged only in the seventh of said first, said second, said third, said fourth, said fifth, said sixth, and said seventh forward speed ratios.

2. The multi-speed transmission of claim 1, wherein the six torque-transmitting mechanisms include:
a first rotating-type torque-transmitting mechanism selectively engagable to connect the second member for common rotation with the eighth member;
a second rotating-type torque-transmitting mechanism selectively engagable to connect the third member for common rotation with the sixth member;
a third rotating-type torque-transmitting mechanism selectively engagable to connect the second member for common rotation with the fourth member;
a first brake-type torque-transmitting mechanism selectively engagable to ground the fourth member to the stationary member;
a second brake-type torque-transmitting mechanism selectively engagable to ground the sixth member to the stationary member; and
wherein said one of said six torque-transmitting mechanisms is a third brake-type torque-transmitting mechanism selectively engagable to ground the fifth member to the stationary member.

3. The multi-speed transmission of claim 1, wherein the first member is a first sun gear member of the first planetary gear set; wherein the third member is a first ring gear member of the first planetary gear set; wherein the second member is a first carrier member of the first planetary gear set that rotatably supports a first set of pinion gears that mesh with both the first sun gear member and the first ring gear member; wherein the fourth member is a second ring gear member of the second planetary gear set; wherein the sixth member is a second sun gear member of the second planetary gear set; wherein the fifth member is a second carrier member of the second planetary gear set that rotatably supports a second set of pinion gears that intermesh with both the second ring gear member and the second sun gear member;

wherein the third planetary gear set and the fourth planetary gear set intermesh as the compound planetary gear set, the compound planetary gear set having:
- a third carrier member that rotatably supports both a third set of pinion gears and a fourth set of pinion gears;
- a third sun gear member meshing with the third set of pinion gears;
- a fourth sun gear member meshing with the fourth set of pinion gears; wherein the third and fourth sets of pinion gears mesh with one another; and
- a third ring gear member meshing with the third set of pinion gears;

wherein the seventh member is the third carrier member, the eighth member is the third ring gear member, and the ninth member is the fourth sun gear member; wherein the second sun gear member is connected for common rotation with the third carrier member; and wherein the second ring gear member is connected for common rotation with the third ring gear member.

4. The multi-speed transmission of claim 1, wherein the first member is a first sun gear member of the first planetary gear set; wherein the third member is a first ring gear member of the first planetary gear set; wherein the second member is a first carrier member of the first planetary gear set that rotatably supports a first set of pinion gears that mesh with both the first sun gear member and the first ring gear member;

wherein the second and third planetary gear sets intermesh as the compound planetary gear set, the compound planetary gear set having:
- a second carrier member that rotatably supports both a second and a third set of pinion gears;
- a second sun gear member meshing with the second set of pinion gears;
- a third sun gear member meshing with the third set of pinion gears; wherein the second and third sets of pinion gears mesh with one another; and
- a second ring gear member meshing with the second set of pinion gears; wherein the fourth member is the second sun gear member, the sixth member is the second carrier member, and the eighth member is the third sun gear member;

wherein the fourth planetary gear set is a dual-pinion planetary gear set having a fourth sun gear member, a third ring gear member, and a third carrier member rotatably supporting a fourth and a fifth set of pinion gears; wherein the fourth set of pinion gears meshes with the third sun gear member; wherein the fifth set of pinion gears meshes with the fourth set of pinion gears and with the third ring gear member, wherein the fifth member is the fourth sun gear member; wherein the seventh member is the third carrier member;

wherein the second carrier member is connected for common rotation with the third ring gear member; and wherein the third carrier member is connected for common rotation with the second ring gear member.

5. The multi-speed transmission of claim 1, wherein the first member is a first sun gear member of the first planetary gear set; wherein the third member is a first ring gear member of the first planetary gear set; wherein the second member is a first carrier member of the first planetary gear set that rotatably supports a first set of pinion gears that mesh with both the first sun gear member and the first ring gear member;

wherein the second, third and fourth planetary gear sets intermesh as the compound planetary gear set; wherein the compound planetary gear set has:
- a second sun gear member;
- a third sun gear member;
- a second ring gear member;
- a third ring gear member;
- a second carrier member rotatably supporting a second, a third and a fourth set of pinion gears; wherein the second set of pinion gears meshes with the second ring gear member; wherein the third set of pinion gears meshes with the third ring gear member, with the second set of pinion gears, with the fourth set of pinion gears and with the second sun gear member; wherein the fourth set of pinion gears meshes with the third sun gear member; and wherein the fourth member is the second sun gear member, the fifth member is the second ring gear member, the sixth member is the second carrier member, the seventh member is the third ring gear member, and the eighth member is the third sun gear member.

6. The transmission of claim 1, wherein the first member is a first sun gear member of the first planetary gear set; wherein the third member is a first ring gear member of the first planetary gear set; wherein the second member is a first carrier member of the first planetary gear set that rotatably supports a first set of pinion gears that mesh with both the first sun gear member and the first ring gear member;

wherein the fourth member is a second ring gear member of the second planetary gear set; wherein the sixth member is a second sun gear member of the second planetary gear set; wherein the fifth member is a second carrier member of the second planetary gear set that rotatably supports a second set of pinion gears that intermesh with both the second ring gear member and the second sun gear member;

wherein the fourth planetary gear set is a dual-pinion planetary gear set having a fourth sun gear member, a third ring gear member, and a third carrier member that rotatably supports a fourth and a fifth set of pinion gears; wherein the fourth set of pinion gears meshes with the fourth sun gear member; wherein the fifth set of pinion gears meshes with the fourth set of pinion gears and with the third ring gear member;

wherein the fifth member is the third carrier member and the seventh member is the third sun gear member; wherein the second carrier member is continuously connected for common rotation with the third ring gear member; and wherein the second ring gear member is continuously connected for common rotation with the fourth sun gear member.

7. A multi-speed transmission comprising:
an input member and an output member;
a first planetary gear set having a first, a second and a third member;
a second, a third, and a fourth planetary gear set having a fourth, a fifth, a sixth, a seventh, and an eighth member; wherein the fourth, fifth, sixth, seventh, and eighth members rotate in fixed relation to one another; wherein one of the fourth, the fifth, the sixth, the seventh, and the eighth members is connected for common rotation with the output member; wherein at least two of the second, the third and the fourth planetary gear set intermesh as a compound planetary gear set;
wherein the first member of the first planetary gear set is continuously grounded to a stationary member; wherein the third member of the first planetary gear set is continuously connected for common rotation with the input member;

a first, a second and a third rotating-type torque-transmitting mechanism;

a first, a second, and a third brake-type torque-transmitting mechanism;

wherein the first rotating-type torque-transmitting mechanism is selectively engagable to connect the second member for common rotation with the eighth member; wherein the second rotating-type torque-transmitting mechanism is selectively engagable to connect the third member for common rotation with the sixth member; wherein the third rotating-type torque-transmitting mechanism is selectively engagable to connect the second member for common rotation with the fourth member; wherein the first brake-type torque-transmitting mechanism is selectively engagable to ground the fourth member to a stationary member; wherein the second brake-type torque-transmitting mechanism is selectively engagable to ground the sixth member to the stationary member; wherein the third brake-type torque-transmitting mechanism is selectively engagable to ground the fifth member to the stationary member;

wherein the torque-transmitting mechanisms are selectively engagable in different combinations of pairs to establish at least seven forward speed ratios and a reverse speed ratio between the input member and the output member; and wherein the third brake-type torque-transmitting mechanism is engaged only in a lowest one of the at least seven forward speed ratios.

8. The multi-speed transmission of claim 7, wherein the at least seven forward speed ratios are eight forward speed ratios.

* * * * *